Jan. 30, 1923.
E. W. BALLENTINE.
SNAP FASTENER.
FILED APR. 17, 1922.
1,443,611.
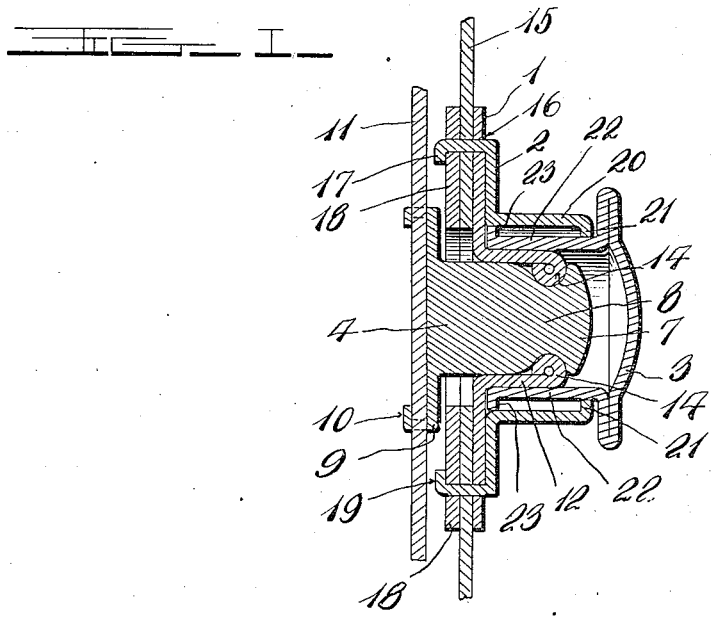
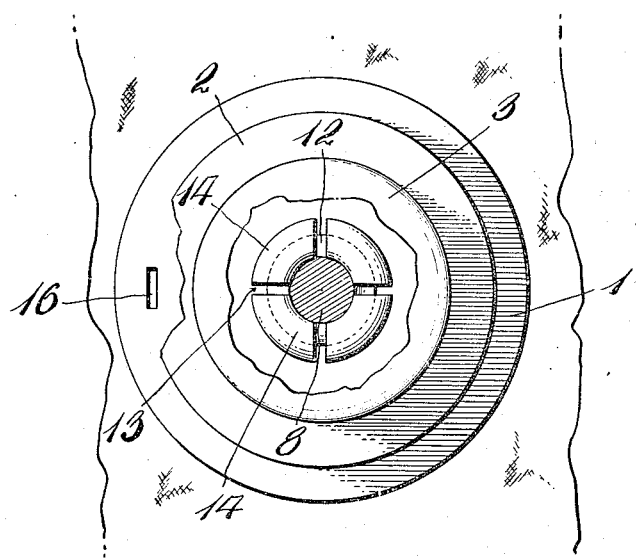
Inventor
Edward W. Ballentine
By Geo. E. Tew
Attorney Patented Jan. 30, 1923.

1,443,611

UNITED STATES PATENT OFFICE.

EDWARD W. BALLENTINE, OF TOLEDO, OHIO.

SNAP FASTENER.

Application filed April 17, 1922. Serial No. 553,737.

*To all whom it may concern:*

Be it known that I, EDWARD W. BALLENTINE, a citizen of the United States, residing at Toledo, in the county of Lucas and State of Ohio, have invented certain new and useful Improvements in Snap Fasteners, of which the following is a specification.

This invention relates to fasteners of that type known as "snap fastener", in which a head or stud is engaged in a socket for connecting parts together. The device is particularly useful for fastening automobile curtains and the like, but may be used in any other place where it is suitable.

The object of the invention is to improve the construction of the socket member, and especially with respect to the means for securing the same to the curtain or other article which is to be fastened.

A further important object of the invention is to provide means for locking the fastener when it is engaged, so that it cannot become disengaged unintentionally. This feature will be found particularly useful in automobile curtains and other places subject to strain, and on which ordinary snap fasteners are apt to become unfastened by air pressure or other strain.

Other details of improvement will be apparent from the following description and the accompanying drawings in which Fig. 1 is a central cross section of the fastener. Fig. 2 is a plan of the socket member, with parts broken away.

Referring specifically to the drawings, 4 indicates a stud having a head 7 connected thereto by a neck 8, and a base 9 which may be provided with tongues 10 which are clinched to fasten the stud member to a fabric 11. If this member is to be fixed to wood or metal other suitable attaching devices may be used.

The socket member comprises a plate 1 at the center of which is struck up a tubular socket 12, which is split as indicated at 13, preferably in four segments, to give the requisite resiliency. The outer end of this socket is curled inwardly, as indicated at 14, to form a bead, the arrangement being such that when the socket is applied to the stud the bead will snap over the head 7 and into the groove around the neck 8.

The plate 1 is provided with a number of slots 16 and is fastened to the curtain or cloth 15 by means of a plate 2 which has tongues 17 inserted through said slots, and through corresponding slots in a washer 18 behind which the tongues are clinched as indicated at 19, the washer being placed on the inside of the curtain, and the plates 1 and 2 on the outside, as shown. The washer may be omitted if desired. The plate 2 is formed with a guide sleeve or tubular boss 20 which terminates in an inturned lip or flange 21, the sleeve serving as a guide, and the lip serving as a stop, for a locking member or cap indicated at 3 which has a tubular part 22 which fits slidably between the socket 12 and the guide 20, and has at its inner end an out-turned flange 23 which stops against the lip 21 when the cap is pulled out.

The sleeve 22 of the cap is of proper size and shape to fit closely over the socket 12, and when pushed in it confines the segments of the socket and prevents the expansion thereof, and consequently locks the bead 14 behind the head 7. By pulling out the cap to the extent permitted by the lip 21 the socket member is released, and the fastener can be separated by a pull sufficient to expand the socket and withdraw the head therefrom in the usual manner. It will be noticed that the cap 3 covers and encloses the socket, so that there is no chance for water to leak through nor for ice or dirt to collect in the fastening.

In use, the cap 3 is pulled out to unlock the socket which is then applied to the stud and the parts engaged in the usual manner. Then the cap is pushed in, which locks the fastening and prevents accidental separation thereof. The closed condition of the socket member adds to its convenience and to its neatness of appearance.

I claim:

1. In a head and socket fastener, the combination with a headed stud, of a socket member having a split resilient outwardly extending socket adapted to fit upon said stud and engage its head, and a cap slidable in and out on the socket and adapted when slid in to lock the same to the stud.

2. In a head and socket fastener, the combination with a headed stud, of a socket member having a split segmental socket adapted to fit upon the stud and engage the head thereof, and a tubular cap fitting around and slidable in and out on the socket and adapted when slid in to lock the segments thereof behind the head.

3. In a head and socket fastener, the combination with a headed stud, of a socket member having a split segmental socket adapted to fit upon the stud and engage the head thereof, and a tubular cap fitting around and slidable in and out on the socket and adapted when slid in to lock the segments thereof behind the head, and means to limit the outward movement of said cap.

4. In a head and socket fastener, the combination with a headed stud of a socket member having a split socket projecting outwardly and adapted to receive and engage said stud, a sleeve surrounding and spaced from said socket, and a cap having a tubular part slidable in and out in said space and adapted when slid in to confine the socket and lock the same to the stud.

5. In a head and socket fastener, the combination with a headed stud, of a socket member having a split segmental socket adapted to fit upon the stud and engage the head thereof, and a tubular cap fitting around and slidable in and out on the socket and adapted when slid in to lock the segments thereof behind the head, and means to limit the outward movement of said cap, said sleeve having an inturned flange at its outer end, and the tubular part of the cap having a projection at its inner end which stops against the flange to limit the outward movement of the cap.

6. In a head and socket fastener, the combination with a headed stud, of a plate having an outwardly projecting split socket adapted to receive and engage said stud, a sleeve surrounding and spaced from said socket and having tongues extending through said plate to fasten the same to a curtain or the like, and a cap enclosing the socket and having a tubular part fitting between the socket and sleeve and slidable in and out for the purpose described.

7. In a head and socket fastener, the combination with a headed stud, of a plate having an outwardly projecting split socket adapted to receive and engage said stud, a sleeve surrounding and spaced from said socket and having tongues extending through said plate to fasten the same to a curtain or the like, and a cap enclosing the socket and having a tubular part fitting between the socket and sleeve and slidable in and out for the purpose described, said sleeve having an internal flange at its outer end and said tubular part having an external flange at its inner end, adapted to stop against said flange when the cap is pulled out.

8. In a head and socket fastener, the combination with a headed stud and an expansible socket adapted to receive said stud, of movable locking means surrounding the socket to prevent expansion of the socket and thereby lock the same to the stud.

In testimony whereof, I affix my signature in presence of two witnesses.

EDWARD W. BALLENTINE.

Witnesses:
JOHN R. BALLENTINE,
D. L. HOFMANN.